United States Patent
Ding et al.

(10) Patent No.: US 10,452,416 B2
(45) Date of Patent: *Oct. 22, 2019

(54) VIRTUALIZATION PLANNING SYSTEM

(71) Applicant: Riverbed Technology, Inc., San Francisco, CA (US)

(72) Inventors: Yiping Ding, Dover, MA (US); David Carter, Bethesda, MD (US); Shankar Ananthanarayanan, Rockville, MD (US)

(73) Assignee: Riverbed Technology, Inc., San Francisco, CA (US)

( * ) Notice: Subject to any disclaimer, the term of this patent is extended or adjusted under 35 U.S.C. 154(b) by 182 days.

This patent is subject to a terminal disclaimer.

(21) Appl. No.: 14/158,726

(22) Filed: Jan. 17, 2014

(65) Prior Publication Data

US 2014/0137117 A1    May 15, 2014

Related U.S. Application Data

(63) Continuation of application No. 13/595,372, filed on Aug. 27, 2012, now Pat. No. 8,661,438, which is a
(Continued)

(51) Int. Cl.
*G06F 9/455* (2018.01)
*G06F 9/50* (2006.01)
*G06F 11/34* (2006.01)

(52) U.S. Cl.
CPC ........ *G06F 9/45533* (2013.01); *G06F 9/5077* (2013.01); *G06F 11/3447* (2013.01); *G06F 2201/815* (2013.01)

(58) Field of Classification Search
None
See application file for complete search history.

(56) References Cited

U.S. PATENT DOCUMENTS 7,818,145 B2   10/2010   Wood et al.
8,255,906 B2 *  8/2012   Ding ................... G06F 9/5077
                                             718/1
(Continued)

OTHER PUBLICATIONS

Bolker at al. (How Many Guests Can you Serve?—On the Number of Partitions, 2006, pp. 1-11).*
(Continued)

*Primary Examiner* — George Giroux
(74) *Attorney, Agent, or Firm* — Park, Vaughan, Fleming & Dowler LLP; Laxman Sahasrabuddhe

(57) ABSTRACT

An interactive virtualization management system provides an assessment of proposed or existing virtualization schemes. A Virtual Technology Overhead Profile (VTOP) is created for each of a variety of configurations of host computer systems and virtualization technologies by measuring the overhead experienced under a variety of conditions. The multi-variate overhead profile corresponding to each target configuration being evaluated is used by the virtualization management system to determine the overhead that is to be expected on the target system, based on the particular set of conditions at the target system. Based on these overhead estimates, and the parameters of the jobs assigned to each virtual machine on each target system, the resultant overall performance of the target system for meeting the performance criteria of each of the jobs in each virtual machine is determined, and over-committed virtual machines and computer systems are identified.

12 Claims, 2 Drawing Sheets

Related U.S. Application Data continuation of application No. 12/196,044, filed on Aug. 21, 2008, now Pat. No. 8,255,906.

(60) Provisional application No. 60/968,025, filed on Aug. 24, 2007.

(56) References Cited

U.S. PATENT DOCUMENTS

| | | | |
|---|---|---|---|
| 8,661,438 B2* | 2/2014 | Ding | G06F 9/5077 |
| | | | 718/1 |
| 2006/0074970 A1* | 4/2006 | Narayanan | G06F 11/3419 |
| 2007/0156860 A1* | 7/2007 | Nedelcu | H04L 41/12 |
| | | | 709/220 |
| 2008/0155537 A1* | 6/2008 | Dinda | G06F 9/4887 |
| | | | 718/1 |
| 2008/0288941 A1 | 11/2008 | Adams et al. | |

OTHER PUBLICATIONS

Padala et al. (Performance Evaluation of Virtualization Technologies for Server Consolidation, Apr. 2007, pp. 1-14).*

Specht (A General Regression Neural Network, Nov. 1991, pp. 568-576).*

Wang et al.: "Capacity and Performance Overhead in Dynamnic Resource Allocation to Virtual Containers", Integrated Network Management, 2007, 10th IFIP/IEEE International Symposium, May 1, 2007.

Desai; "Profiling and Load Distribution for Virtual Machines", Aug. 8, 2006.

Salsberg et al.; "It May be Virtual—But the Overhead is Not" Measure It, Mar. 2007.

Ajiro et al.; "Measuring Resource Management Overhead for server Virtualization", IPSI SIG technical Report; Aug. 20, 2006.

Bolker et al,; "Virtual Performance Won't Do: Capacity Planning for Virtual Systems", CMG Proceedings V1; Dec. 2005.

\* cited by examiner

VIRTUALIZATION PLANNING SYSTEM

This application is a continuation of U.S. patent application Ser. No. 13/595,372, filed 27 Aug. 2012, which is a continuation of U.S. patent application Ser. No. 12/196,044, filed 21 Aug. 2008 and issued as U.S. Pat. No. 8,255,906 on 28 Aug. 2012, which claims the benefit of U.S. Provisional Patent Application 60/968,025, filed 24 Aug. 2007.

BACKGROUND AND SUMMARY OF THE INVENTION

This invention relates to the field of systems analysis and planning, and in particular to server consolidation and virtualization through performance analysis, modeling, and prediction.

The increase in processing power and storage available in computer devices and systems has initiated a resurgence in 'central processing systems', where multiple tasks are serviced on a number of servers, each server being time-shared among different tasks. Simple time-sharing, however, can lead to interaction problems, particularly if one of the time-shared tasks exhibits abnormal behavior and interferes with the other tasks, or causes the computer system to shut down.

The concept of "virtual machines (VMs)" was pioneered in the mid-1960s by IBM and MIT. A 'main-frame computer' was partitioned into individual 'virtual machines', each virtual machine appearing to each user, or group of users, as an independent entity, and each virtual machine being protected from tasks running on other virtual machines. As the concept has progressed, the term "virtualization" is generally used to describe the dividing of resources of a computer into multiple execution environments, using such techniques as hardware and software partitioning, time-sharing, machine emulation, and so on.

As computers become increasingly more capable, the concept of sharing resources among multiple users is likely to increase, particularly in computing-intensive environments, such as universities, government organization, mid to large corporations, and so on. To be effective, such environments require effective management of the shared resources, to balance workloads and/or assure sufficient performance to particular tasks.

In a typical multi-computer shared environment, the management of virtualized resources generally requires satisfying particular performance expectations. In some instances, a specified service level is guaranteed in a 'service level agreement' (SLA), which provides at least a minimum level of service, and either limits the service to a specified performance level or provides as much performance above the specified limit as is available at the time; in other instances, all users are given equal priority, and are promised as much performance as is available at the time, without any guarantees, but with the hope of being provided an average performance that substantially exceeds an estimated minimal performance. In other situations, users acquire a particular number of 'shares' of the available resources, and a weighted priority scheme is used, allocating resources based on the number of acquired shares, the weighted allocation being based on either the total number of shares allocated, or the total number of shares that are currently allocated to active tasks. Such allocation rules and methods are generally referred to as 'priority schemes'.

The effective and efficient management of a virtual system requires an effective and efficient allocation of virtual machines to actual computers to optimize the processing resources that are provided to the various users of the virtual machines and/or to optimize user satisfaction, based on each user's acquired share of the available resources. As used herein, 'acquired share' refers to the relative share of resources that are expected to be provided to the particular user, and may be based on a purchase of such shares, an allocation of shares based on the particular task being performed, an allocation of shares based on a status of the particular user or particular task, and/or any other scheme for prioritizing each user's allocation of available resources.

This allocation of resources, even among equal shareholders, however, is not a simple linear allocation. If two virtual machines are running on a computer, the allocation of processing to the virtual machines will not be equal to the total processing capabilities of the computer, because some processing will be consumed by the application ("virtualization technology") that is providing the segregation of the available processing between the two tasks. As the number of virtual machines on the computer increases, the loss of available processing due to the overhead associated with providing the virtualization scheme increases, in some cases resulting in an overhead loss of 15% or more of the processing available to the virtual machines.

The aforementioned overhead loss is not solely dependent upon the number of virtual machines running on a particular computer. Other factors, such as the technology used to provide the virtualization, the utilization of resources by each task on each virtual machine, the number of physical processors on the computer, the priority associated with each task, and so on, will affect the efficiency with which the virtualization process will perform.

A variety of competing virtualization technologies are currently available, including, for example, Hyper-threaded Processor, VMware ESX, AIX Micropartition, Microsoft Virtual Machine Technology, Sun N1, HP nPar, vPar, and IBM PR/SM, each potentially producing different overhead losses under different conditions, and as the use of virtualization increases, the number of available virtualization technologies can be expected to increase. As with most competing technologies, each virtualization technology appears to have certain advantages and disadvantages, and no single virtualization technology can be said to be ideal for any and all combinations of task allocations. Selecting the appropriate virtualization technology for a given environment, or selecting the appropriate set of virtualization technologies to satisfy different groups of tasks in a given environment, is becoming increasingly difficult for managers of large computing facilities.

Satisfying the requirements for effective and efficient virtualization allocation is further complicated by the dynamic nature of most computing environments. With advances in computing technology, it is rare for a computing environment to remain static for even a year. As new computing systems are introduced and older computing systems removed from service, the allocation of resources in a virtual environment becomes increasingly complicated.

It can be expected, for example, that as virtualization becomes more prevalent, the design of future high-performance computing systems will include features targeted to virtual systems, generally to reduce the virtualization overhead for all configurations, or to minimize the virtualization overhead within a particular band of configurations. In like manner, it can be expected that current virtualization technologies will advance, and new virtualization technologies will be introduced. As can correspondingly be expected, the reallocation of virtual machines among computing systems, as existing systems are replaced by other systems and configurations having different virtualization performance characteristics, will often be a very daunting task.

It would be advantageous to provide a virtualization management system that facilitates the allocation of virtual machines among multiple computer systems. It would also be advantageous to estimate the overhead losses associated with a given allocation of virtual machines among multiple computer systems.

These advantages, and others, can be realized by an interactive virtualization management system that provides an assessment of proposed or existing virtualization schemes. A Virtual Technology Overhead Profile (VTOP) is created for each of a variety of configurations of host computer systems and virtualization technologies by measuring the overhead experienced under a variety of conditions. The multi-variate overhead profile corresponding to each target configuration being evaluated is used by the virtualization management system to determine the overhead that is to be expected on the target system, based on the particular set of conditions at the target system. Based on these overhead estimates, and the parameters of the jobs assigned to each virtual machine on each target system, the resultant overall performance of the target system for meeting the performance criteria of each of the jobs in each virtual machine is determined, and over-committed virtual machines and computer systems are identified.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

Figure 1:
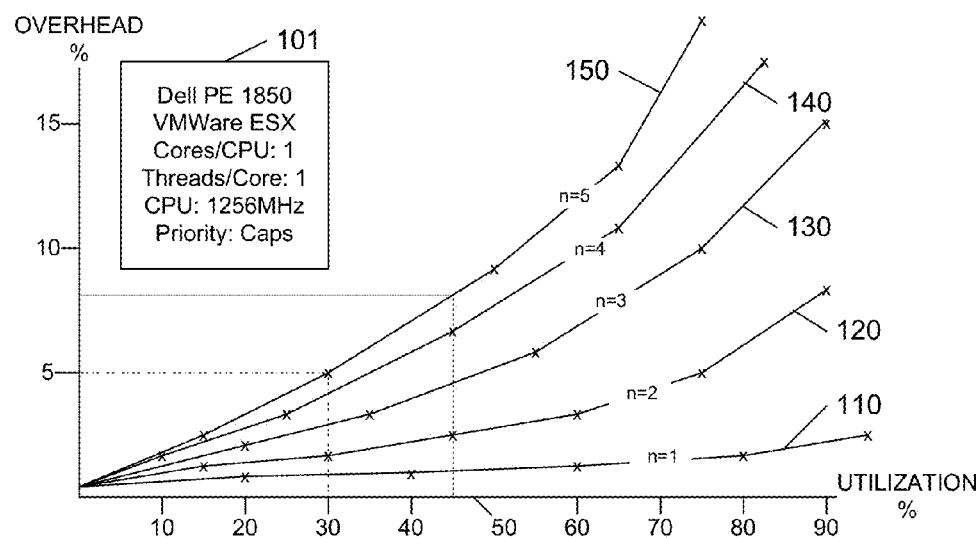
FIG. 1 illustrates an example segment of a virtual technology overhead profile in accordance with this invention.

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

This invention addresses the performance aspect of an actual or planned virtualization embodiment/environment, and provides an assessment of the virtualization environment to assist users in providing an embodiment that effectively achieves performance and business goals. These goals may be explicit or assumed; for example, in many virtualization environments, services are provided in accordance with a Service Level Agreement (SLA), wherein the provider of the virtual machine services contracts to provide a minimum performance level.

When a virtual machine is created on a host computer, the performance of that virtual machine will be dependent upon a variety of factors. The primary factors affecting the performance of a virtual machine include, for example, the processing power of the host computer, the number of other virtual machines on the host, the total load/utilization placed on the host by the virtual machines, and so on. The dependency on the number and utilization of the virtual machines is often a function of the particular virtualization technology that is used to provide the virtualization services. Other factors will also affect the performance of virtual machines on a host computer, such as the priority scheme used for allocating the processing capabilities among the virtual machines, the configuration of the computer system in terms of the number of processors, the number of threads per processor, size of memory, and so on.

The load of a virtual machine is generally defined in terms of 'utilization'. For a given computer system, the amount of resources (typically percentage of CPU time) used by a task in a non-shared environment defines its 'native' utilization. If a task is slowed down because of insufficient computer resources, the resources are being over-utilized. Preferably, sufficient resources should be provided so as never to delay the task; that is, in a preferred system, the resources should always be under-utilized. Because the utilization of a task generally varies during the execution of the task, avoiding the introduction of any delay during the execution of the task generally requires that the system should be configured to be substantially under-utilized relative to the overall/average utilization of a task, to avoid delays during peak utilization periods.

The difference between a job's performance/utilization on a single dedicated host and the job's performance on a nominally-equivalent virtual machine is generally defined as the "virtualization overhead". This overhead arises due to the time required to switch physical resources between virtual machines, the control of the switching between machines, losses introduced by interrupting ongoing processes, and so on.

A number of performance assessment schemes have been proposed, generally using analytic models to capture the dependency of the virtual machine on each of the factors that are considered relevant to the achievable performance of a given virtualization technology. Such analytic models, however, are difficult to develop, and require extensive testing to determine their validity/accuracy. Additionally, when modifications are made to an existing virtualization technology, or a new virtualization technology is introduced, there will generally be a substantial delay before new analytic models can be created.

In accordance with this invention, empirical models, based on the performance of actual virtualization embodiments, are used to estimate the performance that can be expected to be achieved on other virtualization embodiments. A collection of performance measurements are determined for a given virtualization technology on a given host computer for a variety of conditions. These measures are used to determine the overhead introduced for each of the variety of conditions, thereby forming a multi-variate overhead profile for the given virtualization technology on the given host computer system. As new or modified virtualization technologies and computer systems are introduced, the performance of the new configuration is measured under the aforementioned variety of conditions, and a new overhead profile is created for this new combination of virtualization technology and host computer system.

The measurement of overhead for the variety of conditions/operational parameters form a locus of points in a multi-dimensional space, one of the dimensions corresponding to the measured overhead and each of the other dimensions corresponding to a varied operational parameter, such as the number of virtual machines, the total task (or job) utilization, the CPU speed, the number of cores per CPU, the number of threads per CPU, and so on. Assuming substantial continuity in each dimension, this locus of measured points defines a surface in the multi-dimensional space.

Using these multi-variate overhead profiles, a performance modeling system selects the profile corresponding to the virtualization technology and host computer system of the system being modeled (the 'target' system), then determines the point on the multi-dimensional surface corresponding to the overhead produced by the particular condition/set of operational parameters of the particular target system. Because this performance modeling system determines the overhead based on a multi-dimensional profile that is created by measuring the overhead of a particular system configuration under a variety of conditions, this performance modeling system can be used to determine the overhead on any system configuration for which a profile exists or can be created.

FIG. 1 illustrates an example segment of a multi-variate overhead profile. In this example, the overhead measurements are based on a given set of conditions 101, and include a measure of the overhead as a function of the number of virtual machines running on the system, and the total native utilization by the jobs running on these virtual machines. The plot 110 of points corresponds to the measured overhead with one virtual machine running under the given conditions 101 with various levels of total job utilization. In like manner, the plots 120, 130, 140, 150 of points correspond to the measured overhead with two, three, four, and five virtual machines running on the system at various levels of total job utilization. Although drawn in two-dimensions, for ease of illustration, one of skill in the art will recognize that a three-dimensional plot of the measured points using utilization, the number of virtual machines, and the measured overhead will define a locus of points on a surface in these three dimensions.

The creation of a test scenario for measuring overhead at different utilization levels can be facilitated by creating a test script that includes an input parameter that controls the number of CPU cycles consumed by the script, then executing this script for each of a desired amount of utilization, based on the computer system's speed.

As can be seen, the example overhead measurements of FIG. 1 indicate that the overhead is a non-linear function of utilization, the degree of non-linearization being non-linearly dependent upon the number of virtual machines running on the host system.

Other segments of the overhead profile are created for other conditions 101 with the same host "Dell PE 1850" and same virtualization technology "VMware ESX". For example, the measurements of FIG. 1 may be created for different combinations of cores per CPU, threads per core, and CPU speed. In this manner, the segments for this CPU and virtualization technology can be combined to form a set of overhead measurements that are based on each of these five variables: total utilization, number of virtual machines, cores per CPU, threads per core, and CPU speed.

One would expect that if a target system under evaluation is operated under the same conditions as one of the measured points defining the overhead profile, its overhead would be similar to the previously measured overhead. For example, one would expect that a target system comprising a Dell PE 1850 running five virtual machines under VMware ESX at 1256 MHz with one core per CPU, one thread per core, and 30% utilization would experience about 5% overhead, as illustrated by the dashed lines in FIG. 1.

In like manner, a target system comprising the same host computer and virtualization technology as illustrated in FIG. 1, but operating with different values of the other five conditions than had been measured directly can be expected to exhibit an overhead that is bounded by the measured overhead values around that point in the multi-dimensional space. Assuming continuity between measured points in the multi-dimensional space, the overhead at points between these measured points can be estimated using multi-dimensional interpolation. FIG. 1 illustrates an interpolation in one dimension, utilization, for determining that the overhead that can be expected on a target system of the same configuration (Dell PE 1850 running five virtual machines under VMware ESX at 1256 MHz with one core per CPU, one thread per core) with a 45% utilization is approximately 8%, as illustrated by the dotted lines in FIG. 1.

As noted above, the overhead profile will generally exhibit a non-linear dependency on the condition values. As such, the aforementioned n-dimensional interpolation is preferably a non-linear interpolation, typically using a polynomial function. The degree of the polynomial will be dependent upon the observed degree of non-linearity and an error estimate associated with the determined coefficients of the polynomial. For example, if a curve fitting program provides coefficients of a second-degree polynomial with a lower error factor than a third-degree polynomial, the simpler second-degree polynomial would preferably be used.

In a preferred embodiment, in lieu of maintaining a record of all measured points in the n-dimensional space and performing interpolations between measured points in the vicinity of the target system's coordinate in the n-dimensional space, the overhead dependency on one or more of the dimensions can be represented by the coefficients of a polynomial. For example, if a particular condition is known to provide a substantially linear dependency, this dependency can be defined by the slope and intercept values of a linear equation (a 1-degree polynomial). If these coefficients vary as a function of the other condition values, different slope and intercept values can be defined for each of the other condition values, or a multi-variate polynomial can be defined to represent these dependencies.

In like manner, CPU speed is generally known to provide a determinable scaling of performance. In a preferred embodiment, multiple sets of measurements are not performed to measure the overhead at different CPU speeds. All measurements for a given overhead profile are performed at a fixed CPU speed, and the overhead on a system with a different CPU speed is determined as discussed above without regard to CPU speed, and then scaled appropriately. The appropriate scaling factor can be found using a variety of know techniques, or a variety of published results. For example, Standard Performance Evaluation Corporation (SPEC) is a non-profit corporation that establishes, maintains, and endorses a standardized set of benchmarks for high-performance computers, and provides validated measures that can be used to effect this scaling based on CPU speeds.

Figure 2:
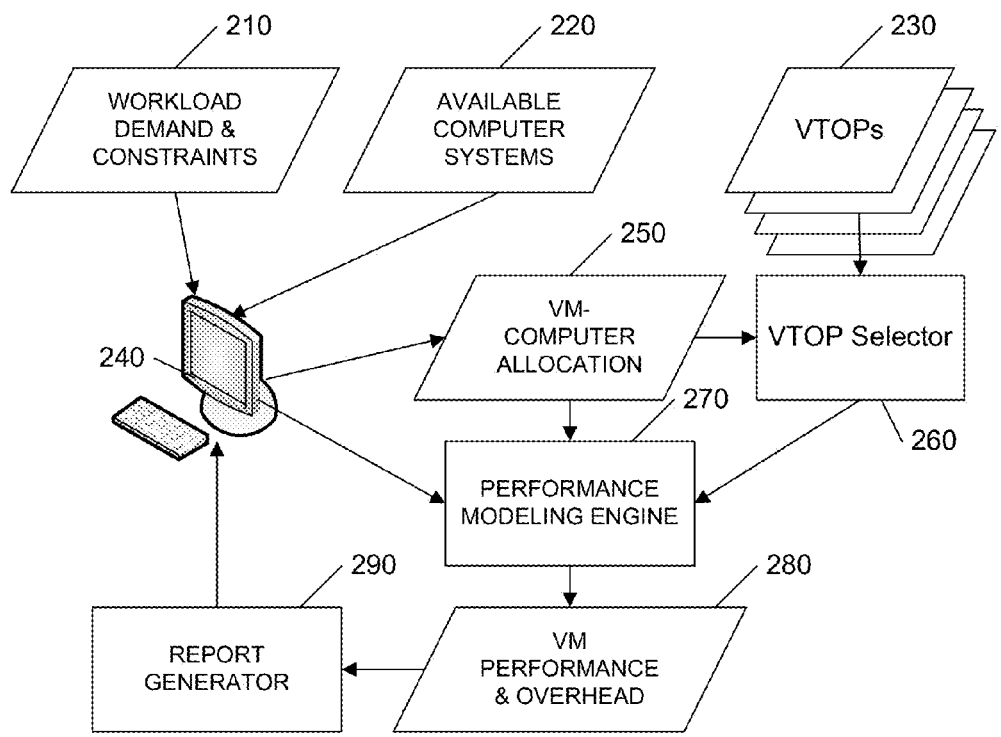
FIG. 2 illustrates an example block diagram of a virtualization management system in accordance with this invention.

FIG. 2 illustrates an example block diagram of virtualization planning system in accordance with this invention.

In this example, a user interface 240 is provided to enable the definition of an allocation of virtual machines to computer systems 250. This definition is based on the workload that needs to be supported 210 and the computer systems that are available to provide this support 220. The allocation will also typically be defined in view of performance criteria associated with each of the workloads 210, as the hosts to which jobs having significant performance criteria are allocated will generally be kept substantially underutilized, if possible.

Figure 3:
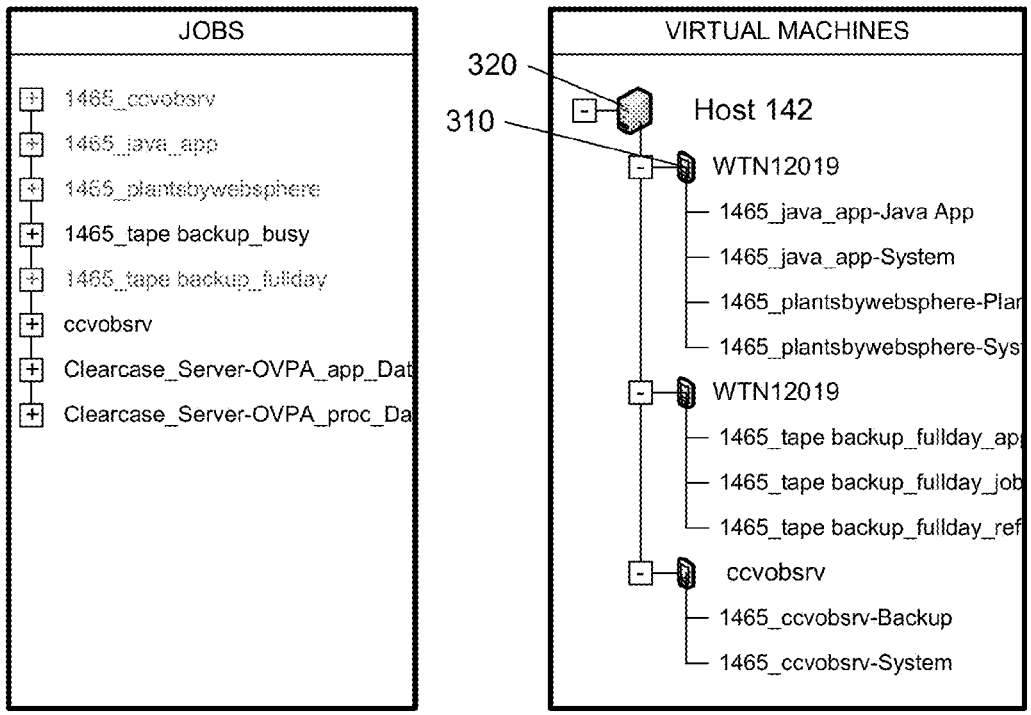
FIG. 3 illustrates an example user interface for defining or changing the allocation of jobs to virtual machines on a host computer system in accordance with this invention.

FIG. 3 illustrates two windows in an example user interface for allocating jobs to virtual machines on host computer systems. The left window lists the jobs to be supported, and the right window illustrates an example host computer. To allocate a job to a computer, the user selects a job and adds it to the displayed computer by 'dragging' the job from the left window and 'dropping' it at the appropriate position in the right window. If the job is dropped on an icon of a virtual machine, the job is assigned to that virtual machine. If the job is dropped at the icon for the host computer 310, a new virtual machine is added to the host and the job is assigned to that virtual machine.

As each job is added to the computer system, the total allocated utilization is increased by a corresponding amount of native utilization associated with the tasks of the job. If the native utilization of a task had been measured on a different computer system than the system to which it is being allocated, the native utilization is scaled appropriately, using the aforementioned standard scaling factors associated with high-performance computer systems.

In a preferred embodiment, jobs can be defined as a collection of tasks, as indicated by the "+" icon at each job; when the job is added to a virtual machine, the individual tasks are displayed. As each job is allocated to a virtual machine, its symbol in the jobs window is dimmed to indicate the allocation. After all of the jobs are allocated, the VM-Computer allocation (250 in FIG. 2) is created.

The VM-Computer allocation 250 identifies the configuration of each computer in terms of virtualization technology employed, and defines the operational parameters specific to the configured computer system. The allocation of virtual machines to the defined computer configuration defines the other operational parameters, including the number of virtual machines assigned and the total utilization by all of the defined jobs on these virtual machines.

A set of previously created overhead profiles (VTOPs—Virtual Technology Overhead Profile) 230, discussed above, are made available to a performance modeling engine 270 for determining the overhead associated with each of configured host computer systems defined in the VM-computer allocation 250. A VTOP selector 260 is configured to select an overhead profile corresponding to the configuration of each target computer from among the set of available VTOPs 230.

In the example embodiment, wherein an overhead profile is stored for each measured computer system and virtual technology combination, the set of VTOPs 230 is searched to find a matching computer system and virtualization technology for each target computer system. If the overhead profiles are collected and stored using a different set of configuration parameters, to reduce, for example, the number of dimensions of the profile by removing discrete parameters for which interpolation is not performed, the selector 260 finds the overhead profile corresponding to these configuration parameters.

Having identified the appropriate overhead profile, the performance modeling engine 270 uses the values of the operational parameters (number of virtual machines, utilization, etc.) of each target computer system to determine the overhead that is to be expected on each target computer system operating with these parameter values. As discussed above, any of a variety of techniques can be used to determine the specific value of the overhead, including multi-dimensional interpolation and/or the use of equations determined by curve-fitting to the measured overhead values.

After determining the overhead incurred on each computer system, the impact of this overhead on the performance of each of the individual tasks is determined. The achievable utilization by each task is affected by the utilization demanded by all of the other competing tasks on the computer. The determined overhead can be considered to be the utilization attributed to a hypothetical overhead task that is also one of these other competing tasks that affect the task's achievable utilization.

As taught by Ethan Bolker and Yiping Ding, in "VIRTUAL PERFORMANCE WON'T DO: CAPACITY PLANNING FOR VITUAL SYSTEMS" [CMG Proceedings, V1, pp 39-49, December 2005], the achievable utilization by each task in an equal-priority scheme can be estimated as:

$$V_i = \frac{U_i}{1 - (U_T - U_i)} \quad (1)$$

where $V_i$ is the achievable utilization by task i, $U_i$ is the native utilization of task i, and $U_T$ is the total utilization, including each task's native utilization and the determined overhead utilization. Appropriate modifications to this equation can be made for other priority schemes using conventional queuing theory models.

Other techniques for estimating the impact of overhead utilization on each device's performance, common in the art, may also be used. In like manner, the impact of the determined overhead on other measures of performance may be assessed in addition to or in lieu of the achievable utilization. For example, in the above referenced article of Bolker and Ding, techniques are provided for determining the impact of virtualization overhead on the response time of each task. The impact on other measures, such as creation or aggravation of bottlenecks, additional memory usage, and so on, can also be determined using techniques common in the art.

The determined overhead and resultant performance 280 is provided to a report generator 290 that provides a variety of reports via the user interface 240. Of particular significance, the report generator 290 compares the criteria 210 associated with each task, typically expressed in a Service Level Agreement (SLA), with the determined performance, and identifies any task that does not satisfy these criteria.

Figure 4:
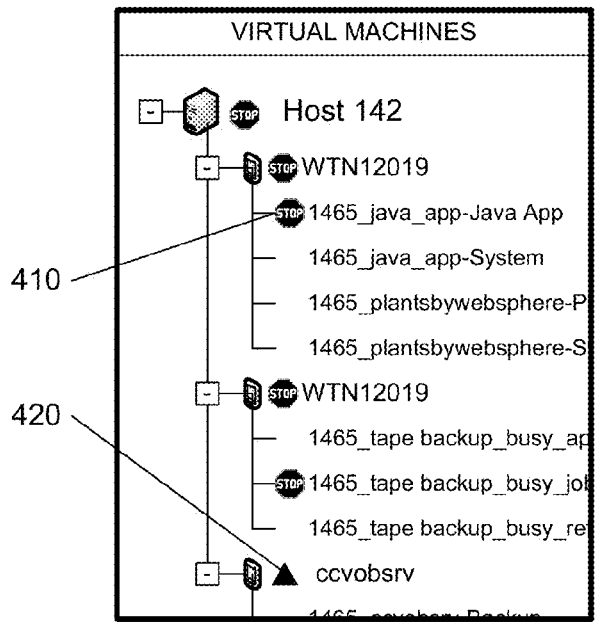
FIG. 4 illustrates an example assessment report from a virtualization management system in accordance with this invention.

FIG. 4 illustrates an example report output window. Each computer system and allocated virtual machines and tasks are displayed. If the estimated performance of the task indicates that the computer system will be unable to satisfy its performance criteria, a visual indication is provided. This indication can take any of a variety of forms, including, for example, signaling a "red light" for failing tasks, and a "yellow light" for marginally passing tasks. If any task fails, the corresponding virtual machine and host computer are also marked as having failed.

In a preferred embodiment, the user interface allows a user to investigate details associated with a given report. For example, in FIG. 4, as the user's cursor passes over a task identifier, the native and achievable utilization for that task is displayed; if the user clicks on the host computer, the achievable utilization for all of the virtual machines and tasks on the computer system is displayed.

The report generator 290 also provides composite printed reports that identify the allocations on each computer system, the determined overhead, the achievable utilization for each task, and so on.

In a preferred embodiment, the report generator 290 is also configured to assess the allocation to provide recommended changes, based on accepted 'good practice' techniques. In like manner, the system may be configured to automate all or some of the virtual machine allocations, using such good practice techniques. For example, an accepted good practice technique is to equalize the utilization allocated to each computer system. To automate the allocation, the workload demand and the total available computer system resources may be used to determine an average utilization per computer system, normalized for different computer systems' performance ratings, and tasks allocated to each computer system until the allocated utilization is approximately equal to the desired average.

Known allocation algorithms, such as the greedy algorithm, may also be used to allocate the jobs in order of utilization demand, each to a different computer system until all systems have one job, then the allocation continues by allocating each next-smaller job to the computer system having the least total allocated utilization. If the jobs have different priority ratings, the jobs are allocated in priority order, and the determination of the next-computer to receive the next-smaller job is based on a weighted measure of utilization, such that the allocation of a higher priority job increases this measure by a larger weight than a lower priority job.

As noted above, because the virtualization planning system of this invention determines virtualization overhead and resultant task performance based on sample measurements of a virtualization technology on particular computer configurations under a variety of conditions, its use is applicable for analyzing virtualization strategies on any given virtualization technology for which such sample measures are available, or can be obtained.

Because the principles of this invention can be applied to any virtualization technology, it would be advantageous for virtualization technology vendors, or third party vendors, to create overhead profiles for a variety of computer systems of the class commonly used to provide virtual services. In like manner, it would be advantageous for vendors of such computer systems to create overhead profiles for a variety of virtualization systems, as an incentive for purchasing their systems for large-scale computer complexes, particularly those with required capacity to meet the Service Level Agreement (SLA).

The foregoing merely illustrates the principles of the invention. It will thus be appreciated that those skilled in the art will be able to devise various arrangements which, although not explicitly described or shown herein, embody the principles of the invention and are thus within its spirit and scope. For example, in the above description, the actual native utilization is assumed to be known; however, any of a number of techniques may be used to determine/estimate native utilizations based on measured virtual utilizations, including the technique disclosed in the aforementioned article by Ethan Bolker and Yiping Ding.

Similarly, the above description discloses the use of multi-dimensional interpolation to determine/estimate the overhead from a given VTOP; however, any of a number of techniques may be used to determine/estimate the overhead based on measured overhead values.

For example, the measured overheads under the different conditions may be used to train a neural network for each configuration, wherein each set of conditions is provided as input and the corresponding measured output is provided as the desired output from the neural network. In this embodiment, each neural network corresponds to a VTOP for each configuration. After the VTOPs are trained using the measured overhead values for the variety of conditions for each configuration, the overhead of a target system can be determined/estimated by providing the conditions of the target system to the VTOP neural network corresponding to the configuration of the target system.

In like manner, although each VTOP is presented above as being discrete for each configuration, one of skill in the art will recognize that a plurality of VTOPs may be included in a single data structure that uses the particular configuration of the computer system as an input parameter for accessing the appropriate overhead values for a given configuration of the target system.

These and other system configuration and optimization features will be evident to one of ordinary skill in the art in view of this disclosure, and are included within the scope of the following claims.

In interpreting these claims, it should be understood that:
 a) the word "comprising" does not exclude the presence of other elements or acts than those listed in a given claim;
 b) the word "a" or "an" preceding an element does not exclude the presence of a plurality of such elements;
 c) any reference signs in the claims do not limit their scope;
 d) several "means" may be represented by the same item or hardware or software implemented structure or function;
 e) each of the disclosed elements may be comprised of hardware portions (e.g., including discrete and integrated electronic circuitry), software portions (e.g., computer programming), and any combination thereof;
 f) hardware portions may be comprised of one or both of analog and digital portions;
 g) any of the disclosed devices or portions thereof may be combined together or separated into further portions unless specifically stated otherwise;
 h) no specific sequence of acts is intended to be required unless specifically indicated; and
 i) the term "plurality of" an element includes two or more of the claimed element, and does not imply any particular range of number of elements; that is, a plurality of elements can be as few as two elements, and can include an immeasurable number of elements.

The invention claimed is:
1. A non-transitory computer-readable medium that includes a program that, when executed by a processor, causes the processor to:
   display representations of a plurality of tasks in a first display panel, wherein the plurality of tasks may be allocated to a plurality of virtual machines on one or more host computers, each virtual machine being managed by an associated virtualization technology;
   display representations of the plurality of virtual machines and the host computers in a second display panel;

allocate a task to a virtual machine selected by a user, wherein the task is allocated to the virtual machine when the user moves a display representation of the task from the first display panel to a display representation of the virtual machine in the second display panel, wherein the virtual machine is associated with one of the host computers;

in response to moving the display representation of the task from the first display panel to the display representation of the virtual machine in the second display panel:

estimate the overhead by a process that includes:

looking-up a set of operating conditions associated with the task, the host computer, and the virtualization technology, looking-up a plurality of overhead profiles to select an overhead profile that matches the set of operating conditions, the overhead profile being based on prior measurements of overhead experienced by a similar host computer and a similar virtualization technology under a plurality of defined sets of operating conditions, wherein the plurality of overhead profiles are based on a plurality of virtualization technologies, each virtualization technology providing a different technique for dividing resources of a computer into multiple execution environments; and using multi-dimensional interpolation, interpolating the overhead from the selected overhead profile;

dynamically generate a report, wherein the report includes performance measure of the task, estimated based on the estimated overhead consumed by the virtualization technology on the corresponding host computer dynamically display information in the report as a plurality of performance indicators associated with all the tasks, hosts and virtual machines in the second display panel; and display, in the second display panel, additional information associated with the report when the user moves a cursor over any of the tasks, hosts and virtual machines in the second display panel.

2. The non-transitory computer-readable medium of claim 1, wherein the program causes the processor to compare the performance measure to a threshold associated with the task, and wherein the displayed information includes an indication that the performance measure does not achieve the threshold.

3. The non-transitory computer-readable medium of claim 1, wherein the program causes the processor to:

display native and achievable utilization for the task in response to the user moving the cursor over the task in the second display panel; and display achievable utilization for all virtual machines and tasks on a host computer in response to the user clicking the host computer in the second display panel.

4. The non-transitory computer-readable medium of claim 1, wherein the set of operating conditions include: a number of virtual machines, total utilization, number of cores per CPU, number of threads per core, and CPU speed; and wherein each overhead profile is associated with different combinations of the set of operating conditions.

5. A method comprising:

displaying, on a display device, representations of a plurality of tasks in a first display panel, wherein the plurality of tasks may be allocated to a plurality of virtual machines on one or more host computers, each virtual machine being managed by an associated virtualization technology, displaying, on the display device, representations of the plurality of virtual machines and the host computers in a second display panel, allocating a task to a virtual machine selected by a user, wherein the task is allocated to the virtual machine when the user moves a display representation of the task from the first display panel to a display representation of the virtual machine in the second display panel, wherein the virtual machine is associated with one of the host computers;

in response to moving the display representation of the task from the first display panel to the display representation of the virtual machine in the second display panel:

estimate the overhead by a process that includes:

looking-up a set of operating conditions associated with the task, the host computer, and the virtualization technology, looking-up a plurality of overhead profiles to select an overhead profile that matches the set of operating conditions, the overhead profile being based on prior measurements of overhead experienced by a similar host computer and a similar virtualization technology under a plurality of defined sets of operating conditions, wherein the plurality of overhead profiles are based on a plurality of virtualization technologies, each virtualization technology providing a different technique for dividing resources of a computer into multiple execution environments; and using multi-dimensional interpolation, interpolating the overhead from the selected overhead profile dynamically generating a report, wherein the report includes performance measure of the task estimated based on the overhead estimate consumed by the virtualization technology on the corresponding host computer;

dynamically displaying information in the report as a plurality of performance indicators associated with all the tasks, hosts and virtual machines in the second display panel; and displaying, in the second display panel, additional information associated with the report when the user moves a cursor over any of the tasks, hosts and virtual machines in the second display panel.

6. The method of claim 5, further comprising: comparing the performance measure to a threshold associated with the task, and wherein the displayed information includes an indication that the performance measure does not achieve the threshold.

7. The method of claim 5, further comprising displaying native and achievable utilization for the task in response to the user moving the cursor over the task in the second display panel; and displaying achievable utilization for all virtual machines and tasks on a host computer in response to the user clicking the host computer in the second display panel.

8. The method of claim 5, wherein the set of operating conditions include: a number of virtual machines, total utilization, number of cores per CPU, number of threads per core, and CPU speed; and wherein each overhead profile is associated with different combinations of the set of operating conditions.

9. A system comprising:

a display unit that displays;
- representations of a plurality of tasks in a first display panel, wherein the plurality of tasks may be allocated to a plurality of virtual machines on one or more host computers, each virtual machine being managed by an associated virtualization technology,
- representations of the plurality of virtual machines and the host computers in a second display panel, wherein a user allocates a task to a virtual machine by moving a display representation of the task from the first display panel to a display representation of the virtual machine in the second display panel, wherein the virtual machine is associated with one of the host computers;

a performance modeling engine that:
- receives the allocation of the task to the virtual machine on one of the host computer systems; and
- in response to moving the display representation of the task from the first display panel to the display representation of the virtual machine in the second display panel:
  - estimates the overhead by a process that includes:
    - looking-up a set of operating conditions associated with the task, the host computer, and the virtualization technology,
    - looking-up a plurality of overhead profiles to select an overhead profile that matches the set of operating conditions, the overhead profile being based on prior measurements of overhead experienced by a similar host computer and a similar virtualization technology under a plurality of defined sets of operating conditions, wherein the plurality of overhead profiles are based on a plurality of virtualization technologies, each virtualization technology providing a different technique for dividing resources of a computer into multiple execution environments; and
    - using multi-dimensional interpolation, interpolating the overhead from the selected overhead profile a report generator that:
- dynamically generates a report, wherein the report includes performance measure of the task, determined by the performance modeling engine, based on the overhead estimate consumed by the virtualization technology on the corresponding host computer;
- dynamically provides information in the report to the display unit, wherein the display unit displays the information in the report as a plurality of performance indicators associated with all the tasks, hosts and virtual machines in the second display panel; and
- dynamically provides additional information, associated with the report, to the display unit, when the user moves a cursor over any of the tasks, hosts and virtual machines in the second display panel, wherein the additional information is displayed in the second display panel.

10. The system of claim 9, wherein the performance modeling engine compares the performance measure to a threshold associated with the task, and wherein the displayed information includes an indication that the performance measure does not achieve the threshold.

11. The system of claim 9, wherein the display unit displays:
- native and achievable utilization for the task in response to the user moving the cursor over the task in the second display panel; and
- achievable utilization for all virtual machines and tasks on a host computer in response to the user clicking the host computer in the second display panel.

12. The system of claim 9, wherein the set of operating conditions include: a number of virtual machines, total utilization, number of cores per CPU, number of threads per core, and CPU speed; and wherein each overhead profile is associated with different combinations of the set of operating conditions.

* * * * *